(12) United States Patent
Huang et al.

(10) Patent No.: US 11,268,254 B2
(45) Date of Patent: Mar. 8, 2022

(54) CAST IN PLACE GEOPOLYMER CONCRETE PILE WITH HEATING UNIT

(71) Applicants: University of Tennessee Research Foundation, Knoxville, TN (US); Hebei Research Institute of Construction and Geotechnical Investigation Co., Ltd., Shijiazhuang (CN)

(72) Inventors: Baoshan Huang, Knoxville, TN (US); Wei Hu, Knoxville, TN (US); Xiang Shu, Knoxville, TN (US); Qiang He, Knoxville, TN (US); Qingke Nie, Shijiazhuang (CN)

(73) Assignees: University of Tennessee Research Foundation, Knoxville, TN (US); Hebei Research Institute of Construction and Geotechnical Investigation Co., Ltd., Shijiazhuang (CN)

(*) Notice: Subject to any disclaimer, the term of this patent is extended or adjusted under 35 U.S.C. 154(b) by 36 days.

(21) Appl. No.: 16/617,877

(22) PCT Filed: Jun. 1, 2017

(86) PCT No.: PCT/CN2017/086847
§ 371 (c)(1),
(2) Date: Nov. 27, 2019

(87) PCT Pub. No.: WO2018/218609
PCT Pub. Date: Dec. 6, 2018

(65) Prior Publication Data
US 2020/0102713 A1 Apr. 2, 2020

(51) Int. Cl.
*E02D 5/36* (2006.01)
*E02D 5/34* (2006.01)
(Continued)

(52) U.S. Cl.
CPC .............. *E02D 5/36* (2013.01); *B28B 11/242* (2013.01); *C04B 40/0209* (2013.01);
(Continued)

(58) Field of Classification Search
CPC ......... E02D 2200/17; E02D 5/34; E02D 5/36; E02D 2250/0023; E02D 2300/002; B28B 11/242; C04B 40/0209
See application file for complete search history.

(56) References Cited

U.S. PATENT DOCUMENTS 5,601,643 A * 2/1997 Silverstrim ............. C04B 28/26
106/624
6,783,273 B1 8/2004 Mullins et al.
(Continued)

FOREIGN PATENT DOCUMENTS

CN 101275425 A 10/2008
CN 105481272 A 4/2016
(Continued)

OTHER PUBLICATIONS

Cristelo et al. (2011), "Deep soft soil improvement by alkaline activation," Institution of Civil Engineers-Ground Improvement, vol. 164, Issue GI2, pp. 73-82.
(Continued)

*Primary Examiner* — Frederick L Lagman
*Assistant Examiner* — Stacy N Lawson
(74) *Attorney, Agent, or Firm* — Jenkins, Wilson, Taylor & Hunt, P.A.

(57) ABSTRACT

Methods of preparing cast-in-place geopolymer piles using electrical heating wire (130) to provide heat to cure the piles are described. The heating wire (130) can be associated with a reinforcement cage (120) inserted in the pile shaft. Rod-shaped heating units comprising electrical heating wire (130) can be inserted into a pile shaft and can be reusable.

(Continued)

Geopolymer piles with high compressive strength can be prepared from mixtures of class F fly ash and aqueous sodium hydroxide by heating the piles with the heating wire to a stable curing temperature for at least about 24 hours.

21 Claims, 9 Drawing Sheets

(51) Int. Cl.
  *B28B 11/24* (2006.01)
  *C04B 40/02* (2006.01)
(52) U.S. Cl.
  CPC .. *E02D 2200/17* (2013.01); *E02D 2250/0023* (2013.01); *E02D 2300/002* (2013.01)

(56) References Cited

U.S. PATENT DOCUMENTS

| | | | |
|---|---|---|---|
| 8,202,362 B2 | 6/2012 | Davidovits et al. | |
| 8,382,369 B2 | 2/2013 | Piscsalko et al. | |
| 9,290,416 B1 * | 3/2016 | Allouche | G01N 33/383 |
| 2006/0119011 A1 * | 6/2006 | Blackmore | C04B 28/02 264/449 |
| 2011/0112272 A1 * | 5/2011 | Seal | C04B 7/243 528/271 |
| 2015/0276702 A1 | 10/2015 | England et al. | |

FOREIGN PATENT DOCUMENTS

| | | | | |
|---|---|---|---|---|
| CN | 105541140 A | | 5/2016 | |
| DE | 1281333 B | * | 10/1968 | H05B 3/56 |
| GB | 951163 A | * | 3/1964 | E04G 21/06 |
| WO | WO-2015118333 A1 | * | 8/2015 | E02D 5/18 |

OTHER PUBLICATIONS

Davidovits, (1994) "Global Warming Impact on the Cement and Aggregates Industries," 24 pages, published in World Resource Review, vol. 6, No. 2, pp. 263-278.
Petermann et al. (2010), "Alkali-Activated Geopolymers: A Literature Review," Applied Research Associates, Inc., 99 pages, see pp. 18-19.
International Search Report corresponding to International Patent Application No. PCT/CN2017/086847 dated Feb. 11, 2018.
IPRP and Written Opinion corresponding to International Patent Application No. PCT/CN2017/086847 dated Dec. 3, 2019.

* cited by examiner

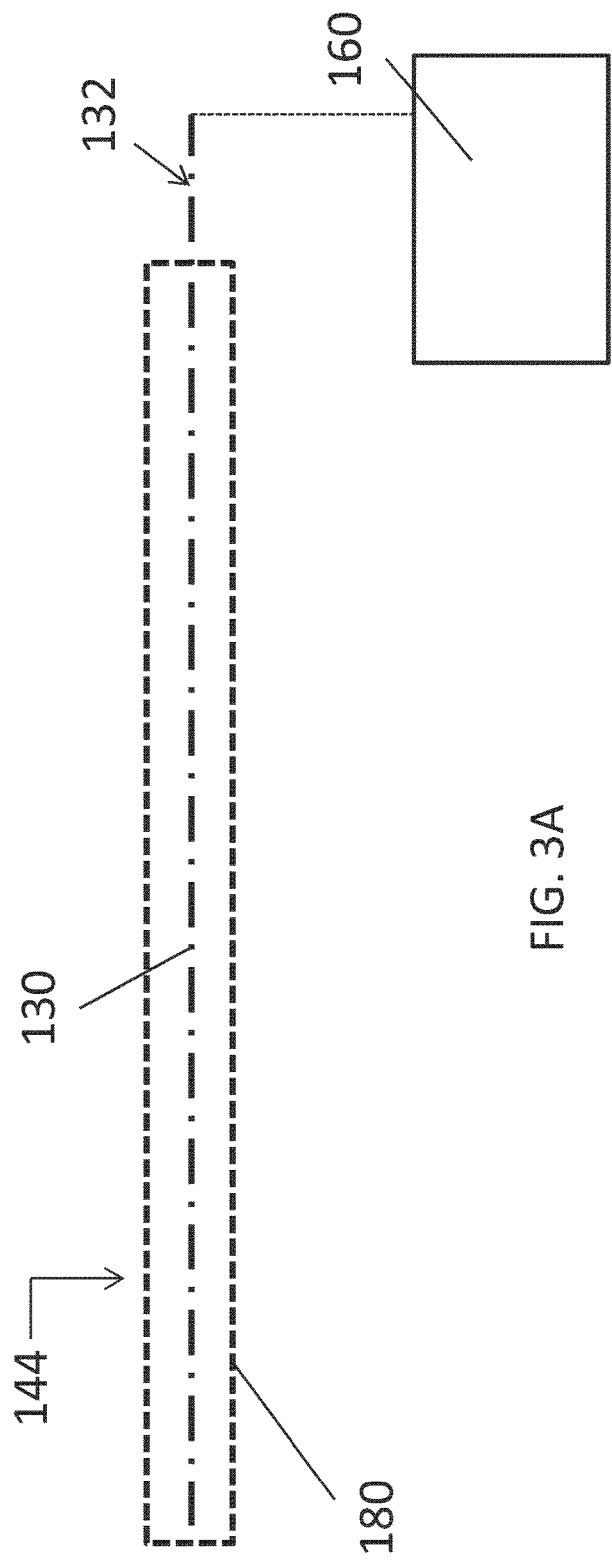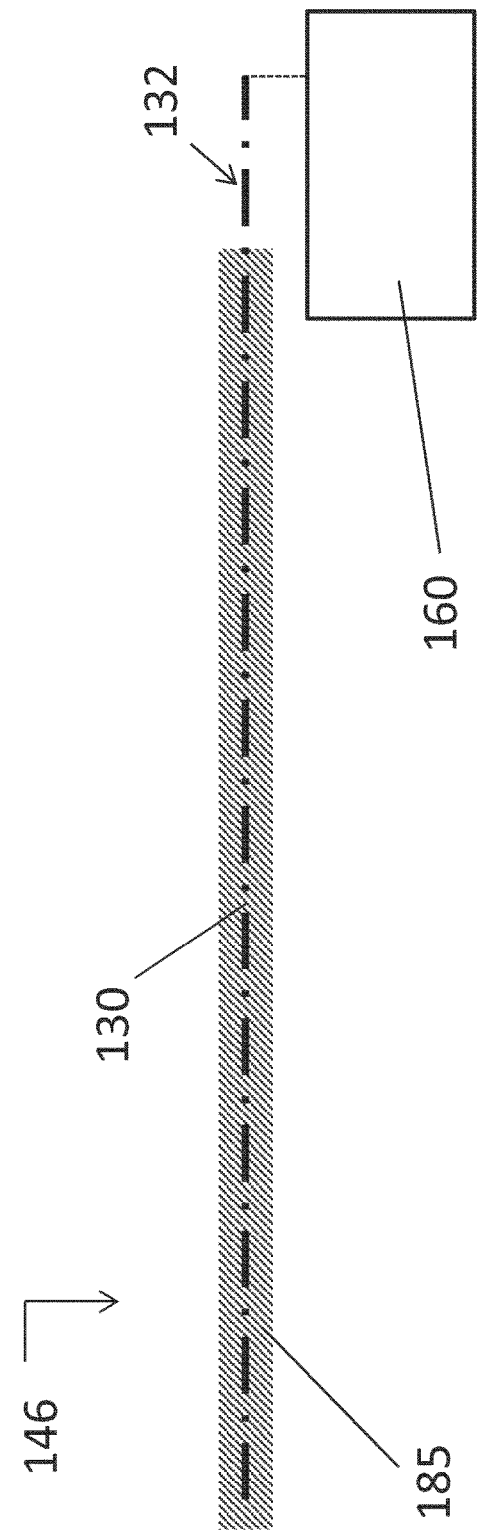

CAST IN PLACE GEOPOLYMER CONCRETE PILE WITH HEATING UNIT

RELATED APPLICATIONS

The present application is a 35 U.S.C. Section 371 national phase application of PCT International Application Serial No. PCT/CN2017/086847, filed Jun. 1, 2017, the disclosure of which is incorporated herein by reference in its entirety.

TECHNICAL FIELD

The presently disclosed subject matter relates to methods and systems for preparing cast-in-place geopolymer piles. The piles are cured with heat from wire heating units, which, in some instance, can be removed after the pile is cured and reused to cure other piles.

ABBREVIATIONS

° C.=degrees Celsius
%=percentage
μL=microliter
μm=microns
A=ampere
Al=aluminum
cm=centimeters
$CO_2$=carbon dioxide
Fe=iron
g=grams
M=molar
min=minute
mL=milliliter
mm=millimeter
MPa=megapascal
OPC=ordinary portland cement
Si=silicon
V=volts
wt %=weight percentage

BACKGROUND

Geopolymer is a cementitious material that has the potential to be an alternative to the ordinary portland cement (OPC). Unlike the mechanism of hydraulic and/or pozzolanic reactions of OPC, geopolymer can be prepared when source materials including an alumina silicate material (such as fly ash, slag, etc.) and an alkaline reagent (such as sodium or potassium hydroxide) react and form an inorganic polymer-like structure, which can serve as a binder. As described by Davidovits et al. in U.S. Pat. No. 8,202,362 B2, the geopolymer network includes $SiO_4$ and $AlO_4$ tetrahedrons alternatively bound by oxygen atoms. Cations present in structural cavities balance negative charges.

There is a rising interest in geopolymers due, at least in part, to increasing emphasis on sustainability. The production of one metric ton of hydraulic cement generates approximately 1 metric ton of carbon dioxide ($CO_2$). The production of geopolymeric cement releases 5 to 10 times less $CO_2$. See Davidovits, World Resource Review, 6(2), pp. 263-278 (1994). Geopolymers also have many other advantages over OPC, such as high strength, high temperature resistance, and acid resistance.

One of the most important source materials for geopolymer cements is fly ash, a by-product of coal power plants. Most fly ash is obtained from the burning of anthracite and bituminous coal. This type of fly ash is referred to as "Class F fly ash" and is low in calcium. In general, fly ash is an acidic material containing acidic oxides such as $Al_2O_3$, $SiO_2$ and $Fe_2O_3$, which provide a potential for alkali reaction. The presence of highly reactive silica increases the formation potential of the aluminosilicate gel which provides mechanical strength to geopolymers.

Several variables including pH, temperature, Si/Al ratio, and alkali concentration can control the geopolymerization reaction rate for the production of fly ash-based geopolymers. In particular, temperature can present a challenge to utilizing geopolymer concretes. Synthesizing fly ash-based geopolymers at ambient temperatures can be difficult, as they do not set at 23° C. See Petermann et al., *Alkali-Activated Geopolymers: A Literature Review*, Applied Research Associates, Inc., Panama City, Fla., 2010, pp. 18-19. It has been found that the geopolymerization reaction is more easily achieved with the addition of an external heat source to promote the alkaline reactivity of the raw materials. It has been suggested that a temperature threshold exists for the geopolymerization reaction, under which the strength gain rate is extremely slow. The widely accepted temperature range for the successful curing of geopolymer is between 50° C. and 80° C., which is higher than ambient temperature and, therefore, impedes the utilization of geopolymer for geotechnical engineering applications, such as in earthwork and foundation construction. The strength development of geopolymer materials which are buried in the soil can be further delayed when compared to the normal-cured samples. See Cristelo et al., Institution of Civil Engineers-Ground Improvement, 164(2), pp. 73-82 (2011). However, an advantage of geopolymer materials is their rapid set time characteristics when cured at an elevated temperature. OPC requires a relatively longer time to fully cure.

Accordingly, there is an ongoing need for additional methods of preparing geopolymer materials, particularly in-ground geopolymer materials, such as cast-in-place geopolymer piles and footings. For example, there is an ongoing need for methods and systems to provide heat to cure geopolymer compositions located beneath ground level and within reasonable timeframes.

SUMMARY

In some embodiments, the presently disclosed subject matter provides a method of preparing a cast-in-place geopolymer concrete pile, the method comprising: (a) providing a subterranean shaft, wherein the shaft extends below ground surface and comprises an open end at ground surface and a bottom end at a pre-determined depth below ground surface; (b) inserting one or more heating units into the shaft, wherein each heating unit comprises one or more lengths of a heating wire, said heating wire comprising an electrically conductive wire, and wherein each heating unit is connectable to a power source; (c) filling the shaft with an uncured concrete composition comprising an uncured geopolymer concrete or an uncured geopolymer cement; and (d) providing an electric current to the one or more heating units, thereby providing heat sufficient to cure the concrete composition and prepare a cast-in place geopolymer concrete pile.

In some embodiments, at least one of the one or more heating units comprises one or more lengths of an insulated heating wire, wherein the insulated heating wire comprises an electrically conductive core surrounded by a layer of an electrically insulating material. In some embodiments, at least one heating unit is detachably or non-detachably attached to a surface of a reinforcement cage, wherein the reinforcement cage is configured to fit within the shaft, optionally wherein the reinforcement cage comprises one or more steel rods and/or rings. In some embodiments, the reinforcement cage has a length such that the cage can extend into the shaft substantially from the open end of the shaft to the bottom end of the shaft; optionally wherein the reinforcement cage has the shape of a hollow cylinder, a hollow cone, or a hollow cuboid. In some embodiments, at least one heating unit comprises a length of insulated heating wire wound spirally, optionally uniformly wound spirally, around the reinforcement cage one or more times, thereby traversing substantially the entire length of the reinforcement cage.

In some embodiments, the one or more heating units comprise at least one rod-shaped heating unit, wherein each rod-shaped heating unit comprises a length of insulated heating wire, and wherein each rod-shaped heating unit is inserted into the shaft, optionally extending from the open end of the shaft to substantially the bottom end of the shaft. In some embodiments, each rod-shaped heating unit is inserted into the shaft proximal to a periphery the shaft. In some embodiments, at least two rod-shaped heating units are inserted into the shaft such that they are approximately evenly distributed around the periphery of the shaft. In some embodiments, the one or more heating units comprise two or three rod-shaped heating units. In some embodiments, one or more of the rod-shaped heating units are configured to be removed from the shaft after the concrete composition is cured.

In some embodiments, the insulated heating wire has a diameter of between about 0.40 millimeters and about 7.35 millimeters. In some embodiments, the uncured concrete composition comprises an uncured geopolymer cement comprising one or more pozzolanic materials selected from the group consisting of class F fly ash, class C fly ash, ground granulated blast furnace slag, calcined metakaolin, and red mud; and one or more alkaline agent selected from the group consisting of sodium hydroxide, potassium hydroxide, and water glass. In some embodiments, the uncured geopolymer cement comprises class F fly ash and a 10 Molar (M) aqueous solution of sodium hydroxide, optionally wherein the weight ratio of aqueous solution to solid in the uncured cement is between about 0.3 and about 0.5, further optionally wherein the ratio is about 0.3.

In some embodiments, providing the electric current comprises applying sufficient electric current to the one or more heating units to heat the uncured concrete composition to a stable temperature of between about 50° C. and about 80° C. In some embodiments, providing the electric current further comprises applying sufficient electrical current to keep the temperature of the uncured concrete composition at the stable temperature for at least 24 hours. In some embodiments, the method further comprises inserting one or more temperature monitors into the shaft to monitor temperature during step (d).

In some embodiments, each of the one or more heating units is adapted for connection to the same power source. In some embodiments, the power source comprises a transformer and a main power source, optionally wherein the transformer can supply a voltage of 30 Volts or less at a current of 0 to 10 ampere to the one or more lengths of heating wire of a heating unit. In some embodiments, the cast-in-place geopolymer concrete pile has a mean compressive strength of at least 20 megapascal (MPa), optionally wherein the cast-in-place geopolymer pile has a mean compressive strength of at least about 40 MPa or at least about 50 MPa.

In some embodiments, the presently disclosed subject matter provides a cast-in-place geopolymer concrete pile prepared by a method comprising: (a) providing a subterranean shaft, wherein the shaft extends below ground surface and comprises an open end at ground surface and a bottom end at a pre-determined depth below ground surface; (b) inserting one or more heating units into the shaft, wherein each heating unit comprises one or more lengths of a heating wire, said heating wire comprising an electrically conductive wire, and wherein each heating unit is connectable to a power source; (c) filling the shaft with an uncured concrete composition comprising an uncured geopolymer concrete or an uncured geopolymer cement; and (d) providing an electric current to the one or more heating units, thereby providing heat sufficient to cure the concrete composition and prepare a cast-in place geopolymer concrete pile.

In some embodiments, the presently disclosed subject matter provides a method of producing a building or construction comprising the use of a cast-in-place geopolymer concrete pile prepared according to the presently disclosed methods.

In some embodiments, the presently disclosed subject matter provides a cast-in-place geopolymer concrete pile prepared by curing an uncured geopolymer concrete or uncured geopolymer cement using heat produced by a heating wire.

In some embodiments, the presently disclosed subject matter provides a system for preparing a cast-in-place geopolymer concrete pile, said system comprising at least one of: (a) a heating unit comprising one or more lengths of heating wire, optionally one or more lengths of insulated heating wire, attached to a reinforcement cage, optionally a steel reinforcement cage; and (b) one or more rod-shaped heating units comprising one or more lengths of heating wire, optionally one or more lengths of insulated heating wire, further optionally wherein each rod-shaped heating unit is enclosed in a detachable housing; wherein each heating unit is adapted for connection to a power source.

In some embodiments, the system further comprises an uncured concrete composition comprising an uncured geopolymer cement or uncured geopolymer concrete, optionally wherein said composition comprises an uncured geopolymer cement comprising one or more pozzolanic materials selected from class F fly ash, class C fly ash, ground granulated blast furnace slag, calcined metakaolin, and red mud, and one or more alkaline agent selected from sodium hydroxide, potassium hydroxide, and water glass. In some embodiments, the uncured concrete composition comprises an uncured geopolymer cement comprising class F fly ash and a 10 Molar (M) aqueous solution of sodium hydroxide, optionally wherein the weight ratio of aqueous solution to solid in the uncured cement is about 0.3. In some embodiments, the system further comprises one or more temperature monitors and/or a power source, wherein said power source comprises a transformer.

Accordingly, it is an object of the presently disclosed subject matter to provide a method of preparing a cast-in-place geopolymer pile, the pile itself, and systems for preparing the pile and/or buildings or other structures using the pile.

An object of the presently disclosed subject matter having been stated hereinabove, and which is achieved in whole or in part by the presently disclosed subject matter, other objects will become evident as the description proceeds hereinbelow.

BRIEF DESCRIPTION OF THE DRAWINGS

FIG. 3A is a schematic drawing of a rod-shaped heating unit of the presently disclosed subject matter that includes a heating wire inside a removable or a non-removable, sacrificial outer housing and attached to a power source.

FIG. 3B is a schematic drawing of an alternative rod-shaped heating unit of the presently disclosed subject matter that includes a heating wire coated with coating that does not react with or adhere to a geopolymer composition.

DETAILED DESCRIPTION

Figure 1B:
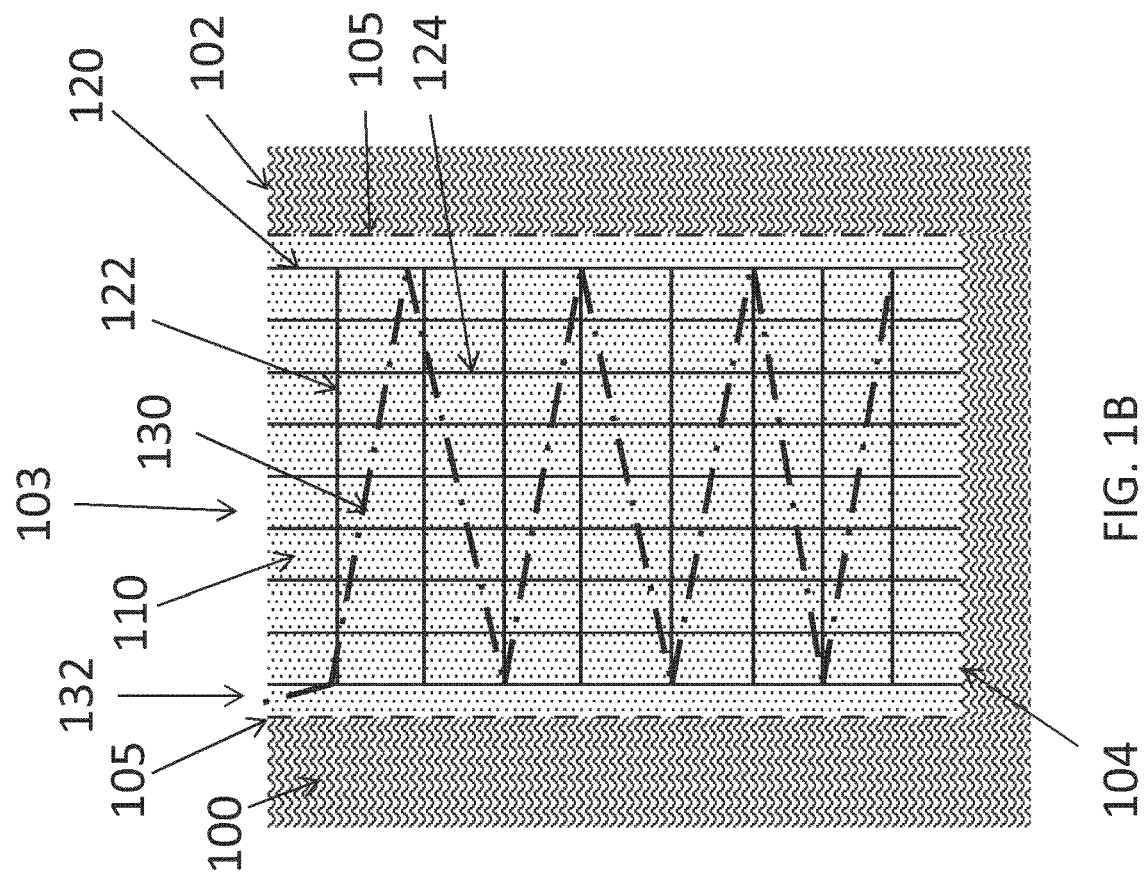
FIG. 1B is a schematic drawing of a side-view of the cylindrical cast-in-place pile of FIG. 1A.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a," "an," and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

The term "comprising," which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Unless otherwise indicated, all numbers expressing quantities of temperature, time, length, diameter, concentration, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value is meant to encompass variations of in one example±20% or ±10%, in another example±5%, in another example±1%, and in still another example±0.1% from the specified amount, as such variations are appropriate to perform the disclosed methods.

Numerical ranges recited herein by endpoints include all numbers and fractions subsumed within that range (e.g. 1 to 5 includes, but is not limited to, 1, 1.5, 2, 2.75, 3, 3.90, 4, and 5).

The term "cement" and "cementitious" as used herein refer to compositions which set and adhere to other materials to act as a binder.

The term "concrete" refers to a material that comprises a cement and aggregate. Suitable aggregate for the geopolymer concretes described herein can be aggregate known for use as aggregate in concretes prepared using OPC. The aggregate can be coarse (e.g, having an average particle size of at least about 4.75 mm (0.195 inches) and up to about 3.81 cm (i.e., 1.5 inches) or more), fine (e.g., having an average particle size of less than about 4.75 mm or between about 0.1 mm and about 4.75 mm) or a combination of coarse and fine aggregate. Suitable coarse aggregate can be inorganic rock material of any particle shape or shapes (e.g., angular, rough-textured, elongated, rounded or smooth). Suitable rock materials include minerals, such as, but not limited to, granite, basalt, quartz, riolite, andesite, tuff, pumice, limestone, dolomite, sandstone, marble, chert, flint, greywacke, slate, and/or gneisses. Suitable materials for fine aggregate include, but are not limited to, sand, dolomite, limestone, calcium carbonate, ground clay, shale, slate, mica, and talc.

The term "pozzolanic" and variations thereof refers to siliceous or siliceous and aluminous materials that, by themselves possess little or no cementitious value, but which can, when in finely divided form, react chemically with calcium hydroxide $(Ca(OH)_2)$ in the presence of water to form cementitious compounds. Pozzolanic materials can be man-made or natural. Examples of pozzolanic materials include, but are not limited to, metakaolin, fly ashes, silica fume, rice husk ash, volcanic ashes, pumice, perlite, diatomaceous earth, finely ground clay, finely ground shale, finely ground slate, and finely ground glass The term "geopolymer" as used herein refers to a covalently bonded, inorganic polymer-like network made from mixtures of water-soluble alkali metal silicates and aluminosilicate mineral powders. Geopolymer networks can comprise $SiO_4$ and $AlO_4$ tetrahedrons alternatively bound by oxygen atoms, with cations present in structural cavities to balance the negative charges.

Fly ash is a fine powder byproduct formed from the combustion of coal, e.g., in electric power plant utility boilers. Fly ashes include mainly glassy spherical particles, as well as residues of hematite and magnetite, char, and some crystalline phases formed during cooling. The structure, composition and properties of fly ash particles depend upon the structure and composition of the coal and the combustion process by which the fly ash is formed. ASTM C618 (2008) recognizes two major classes of fly ash: Class C and Class F. These two types of fly ash are generally derived from different kinds of coals that are a result of differences in the coal formation processes occurring over geological time periods. Class F fly ash is normally produced from burning anthracite and/or bituminous coal while Class C fly ash is normally produced from lignite or sub-bituminous coal.

Class C and Class F fly ashes can be differentiated according to their pozzolanic properties. The minimum limit of $SiO_2+Al_2O_3+Fe_2O_3$ for Class F fly ash according to ASTM C618 is 70%, while the minimum limit of $SiO_2+Al_2O_3+Fe_2O_3$ for Class C fly ash is 50%. Thus, Class F fly ashes are generally viewed as more pozzolanic than Class C fly ashes. Also, while not explicitly recognized in ASTM C618(2008), Class C fly ashes are generally viewed as higher in calcium oxide (lime) content.

II. Methods and Systems

As described above, geopolymer compositions have many characteristics that make them attractive alternatives to other types of cements, such as OPC. With heating, geopolymer compositions can cure rapidly, produce relatively little $CO_2$, and can provide high strength components. Previous studies have revealed the heated curing time for geopolymer compositions need not be more than 24 hours in practical applications, since the rate of increase in strength of geopolymer is generally rapid up to 24 hours. Geopolymer materials with compressive strengths of 60 MPa after only five hours at 85° C. have been reported. See *Khale et al.*, J. Mater. Sci., 42, pp. 729-746 (2007).

However, typical geopolymer compositions, such as those prepared from Class F fly ashes, generally do not cure unless a heating source is provided, making it hard to utilize geopolymers as building materials that are prepared on-site. For example, cast-in-situ piles are those piles which are cast in position inside the ground.

Accordingly, the presently disclosed subject matter provides methods and systems for accelerating the strength development of geopolymer compositions prepared in the ground (e.g., geopolymer piles or footings) or otherwise prepared on location at the site of the end use of the cured geopolymer composition. The presently disclosed methods and systems can heat an uncured geopolymer composition uniformly and using low voltage (e.g., ≤30 volts or ≤20 volts) electricity.

The presently disclosed subject matter provides, in one embodiment, a method of preparing a cast-in-place geopolymer concrete piles and/or footings by providing a heating unit or units. The heating unit can comprise one or more lengths of heating wire. In some embodiments, low voltage electricity (e.g., 30 volts or less) can be passed through the wire, which comprises an electrically conductive material, and which then dissipates heat through the surrounding, uncured geopolymer composition.

In some embodiments, the presently disclosed subject a method of preparing a cast-ion-place geopolymer concrete pile, wherein the method comprises:
(a) providing a subterranean shaft, wherein the shaft extends below ground surface and comprises an open end at ground surface and a bottom end at a predetermined depth below ground surface;
(b) inserting one or more heating units into the shaft, wherein each heating unit comprises one or more lengths of a heating wire, said heating wire comprising an electrically conductive wire, and wherein each heating unit is connectable to a power source;
(c) filling the shaft with an uncured concrete composition comprising an uncured geopolymer concrete or an uncured geopolymer cement; and
(d) providing an electric current to the one or more heating units, thereby providing heat sufficient to cure the concrete composition and prepare a cast-in place geopolymer concrete pile.

The subterranean shaft (i.e., the excavated subterranean shaft) can have any suitable shape and dimensions. As would be understood in the art, the dimensions of the shaft can be determined by the load the pile is intended to support and/or the type of soil or other ground material in which the pile is being cast. The shaft is typically deeper than it is wide. In some embodiments, the shaft can have a cross-section that is approximately round, oval, square, or rectangular. In some embodiments, the shaft can have a depth of between about 40 cm and about 13 meters. In some embodiments, the shaft can have a depth of between about 2 and about 3.5 meters. In some embodiments, the shaft can have a depth of between about 40 cm and about 2 meters or between about 40 cm and about 1 meter. In some embodiments, the shaft can have a diameter of between about 15 cm and about 45 cm. In some embodiments, the shaft can have a diameter of between about 20 cm and about 30 cm. The cast-in-place geopolymer pile prepared from the presently disclosed methods can have dimensions that are about the same as that of the shaft, although a small amount of size difference can occur due to changes in volume during curing to the geopolymer.

In some embodiments, the one or more heating units comprise(s) one or more lengths of an insulated heating wire (which can also be referred to as an "insulated resistance wire"). Thus the heating unit can comprises a heating wire comprising an electrically conductive core surrounded by a layer of an electrically insulating material. The heating unit can comprise a core comprising a single length of electrically conductive wire or multiple wires provided in a braided or unbraided bundle or bundles. The core can comprise, for example, stainless steel, nickel, copper, or an alloy of one or more of copper, nickel, iron, manganese, aluminum, and chromium. The electrically insulating material can comprise a synthetic organic polymer such as, but not limited to, a polyamide (e.g., nylon), a polyimide, polyvinyl chloride (PVC), or a fluorinated polymer (e.g., perfluoroalkoxy alkane (PFA), fluorinated polyethylene (FEP), polytetrafluoroethylene (PTFE), and ethylene tetrafluoroehtylene (ETFE)), or combinations thereof. In some embodiments, the insulating material can comprise a ceramic or a glass-based fabric.

The heating wire (e.g., the insulated heating wire) can have any suitable diameter. In some embodiments, the heating wire can have a diameter of between about 0.1 mm and about 10 mm. In some embodiments, the insulated heating wire has a diameter between about 0.4 mm and about 7.35 mm. In some embodiments, the heating wire is an insulated heating wire with a diameter of between about 0.2 mm and about 1 mm (e.g., about 0.2, 0.3, 0.4, 0.5, 0.6, 0.7, 0.8, 0.9 or about 1.0 mm). In some embodiments, the insulated heating wire has a diameter of about 0.64 mm.

In some embodiments, a reinforcement cage is inserted into the shaft. The reinforcement cage can be configured to fit within the shaft. The reinforcement cage can have any shape or design known in the construction field for reinforcement cages for concrete pilings. The reinforcement cage can comprise one or more metal bars, pipes, rings, and/or coils, as well as connectors for attaching the bars, pipes, rings and/or coils to one another as desired. In some embodiments, the reinforcement cage comprises steel. In some embodiments, the reinforcement cage can comprise non-metal materials, such as fiberglass. The reinforcement cage can be pre-fabricated off-site or made on demand at the construction site. In some embodiments, a heating unit (e.g., an insulated heating wire) is attached, detachably or non-detachably, to the reinforcement cage, which can then hold the heating unit in place and/or help to dissipate the heat provided by the heating wire uniformly.

In some embodiments, the reinforcement cage has a length such that the cage can extend into the shaft substantially from the open end of the shaft to the bottom end of the shaft. In some embodiments, the cage has a length that is at least about 75% or more of the depth of the shaft. In some embodiments, the cage has a length that is at least about 80%, 85%, 90%, 91%, 92%, 93%, 94%, 95%, 96%, 97%, 98%, 99% or about 100% of the depth of the shaft. In some embodiments, the cage can have the shape of a hollow cylinder, a hollow cone, or a hollow cuboid. In some embodiments, the cage has the shape of a hollow cylinder comprising a plurality of metal rods that are perpendicular to the surface of the ground when the cage is inserted in the shaft (i.e., they extend longitudinally in the shaft) connected to or encircled by one or more metal rings that are approximately parallel to the surface of the ground when the cage is inserted in the shaft. Similarly, the cage can have a width or diameter that is at least about 75% or more (e.g., 75%, 80%, 85%, 90%, 92%, 94%. 95%, 96%, 97%, or more) of the width or diameter of the shaft or pile.

In some embodiments, the at least one heating unit comprises a length of insulated heating wire wound around the reinforcement cage, e.g., in contact with the inner surface of the cage (i.e., the surface closer to the center of the shaft) and/or the outer surface of the cage (i.e., the surface closer to the peripheral surface of the shaft). In some embodiments, the wire is wound spirally or in a zig-zag fashion around the cage one or more times. In some embodiments, the wire is wound spirally around the cage uniformly and/or so that the wire traverses substantially (e.g., 75% or more) of the entire length of the cage.

Typically, for embodiments where the heating wire is wound around the cage, the wire can be attached to the cage in a non-detachable manner and left in place following curing of the geopolymer composition. However, in some embodiments, the wire can be non-attached to the cage or attached to the cage detachably or non-permanently and removed from the pile after curing of the geopolymer (e.g., by pulling the wire out from an end extending from the shaft at the ground surface). When the heating wire is to be removed, the wire can include an outer coating, such a vinyl coating, to reduce adherence of the wire to the geopolymer. This coating can be the same as or in addition to the coating that provides electrical insulation. Alternatively, in some embodiments, the reinforcement cage can include one or more hollow pipes into which an insulated heating wire can be inserted during curing of the pile. After the pile is cured, the heating wire can be removed from an open end of the pipe located at or near ground level, e.g., so that the heating wire can be reused.

Figure 1A:
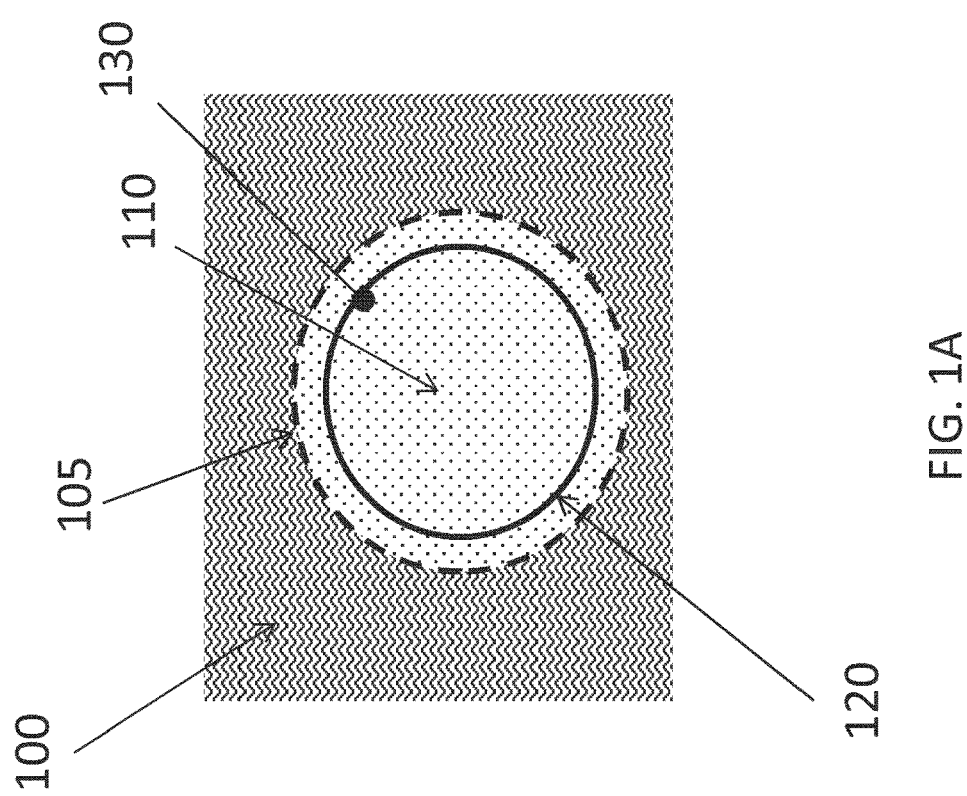
FIG. 1A is a schematic drawing of a cross-sectional view of an uncured, cylindrical cast-in-place geopolymer pile according to an embodiment of the presently disclosed subject matter wherein the pile is cured using heat from a wire heating unit wrapped around a reinforcement cage within the pile.

FIGS. 1A-1D show schematic diagrams of exemplary embodiments of cast-in-place geopolymer piles prepared with the use of a reinforcement cage with an insulated heating wire wound spirally around the cage. FIG. 1A shows a cross-sectional view of a cylinder-shaped, uncured cast-in-place pile. Outside shaft wall 105 is soil, rock and/or sand 100. Inserted into the shaft is reinforcement cage 120 having a diameter smaller (e.g., between about 5% and about 30% smaller) than the diameter of the shaft. Uncured geopolymer composition 110 fills the shaft, both within and outside cage 120. Heating unit 130, e.g., an insulated heating wire, is adjacent to and in contact with cage 120.

FIG. 1B shows a side view of the same exemplary pile. FIG. 1B shows reinforcement cage 120 extending from open end 103 of the shaft further defined by shaft wall 105 to bottom end 104 of the shaft, abutting soil, rock and/or sand 100 at bottom end 104 of the shaft. Reinforcement cage 120 includes horizontal rings 122, which are horizontal to the axis of the shaft, and longitudinal bars 124, which are parallel to the axis of the shaft. Rings 122 and bars 124 can be approximately evenly spaced over the length of the shaft and/or around the shaft diameter, or spaced at any desired interval (e.g., every foot, every 0.5 meters, every 10 cm, etc). Uncured geopolymer composition 110 fills the shaft, both within and outside of cage 120. Insulated heating wire 130 is wound uniformly around cage 120, traversing most of the length of the cage. End 132 of insulated heating wire 130 extends to ground surface 102, extending out of shaft open end 103 and is connectable to a power source.

Figure 1C:
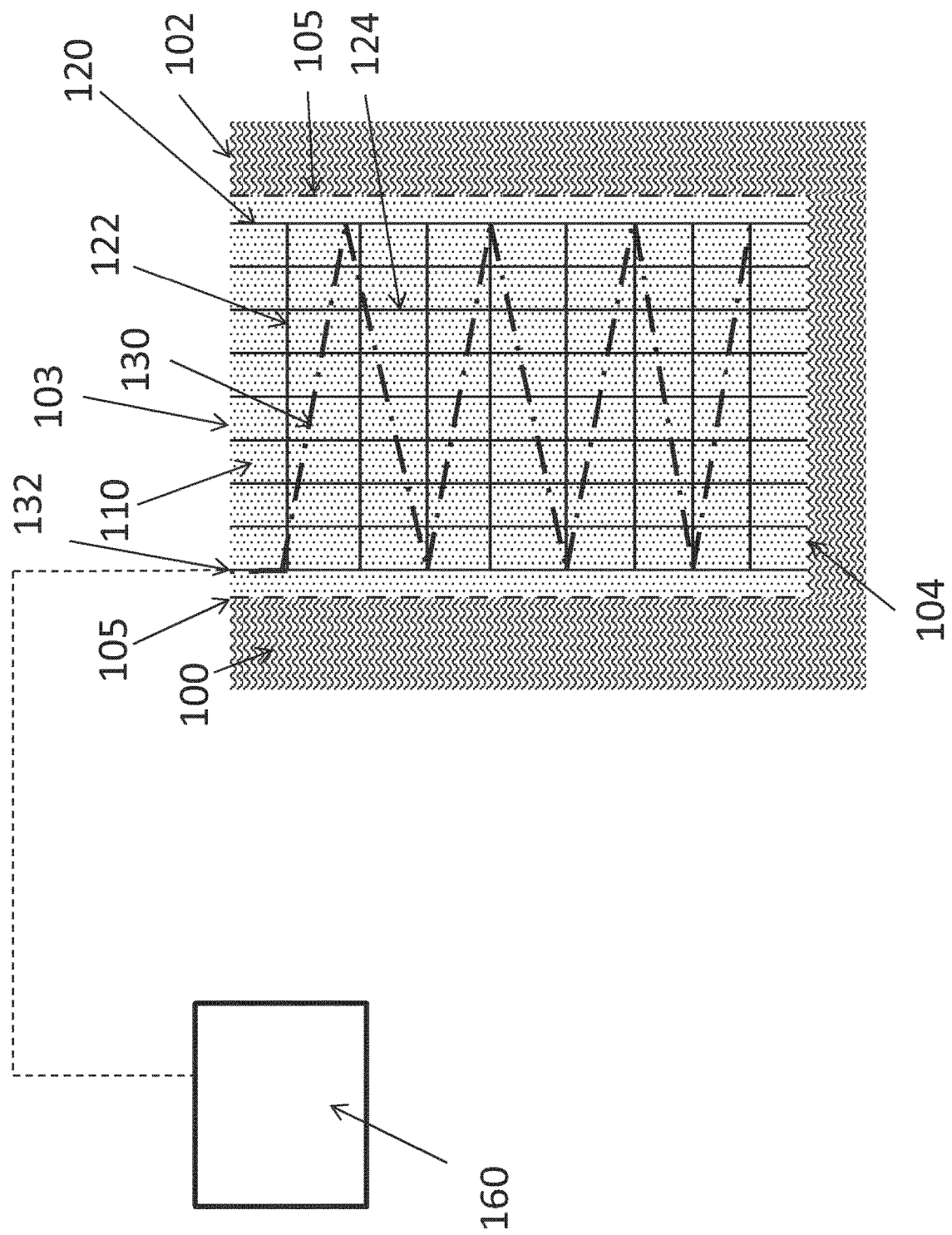
FIG. 1C is a schematic drawing of a side-view of the cylindrical cast-in-place pile described for FIGS. 1A and 1B, further showing the attachment of the wire heating unit to a power source.

FIG. 1C shows the exemplary pile of FIGS. 1A and 1B wherein end 132 of insulated heating wire 130 is attached to power source 160. The power source can comprise one or more batteries or other sources of electric current, such as an electrical generator or a mains power supply. In some embodiments, power source 160 also comprises a transformer. In some embodiments, the power source and/or the transformer can supply a voltage of about 30 volts or less at a current of up to about 10 ampere to heating wire 130.

Instead of being wound around the reinforcement cage, in some embodiments, a netting comprising insulated heating wire can be prepared and attached to or hung around the reinforcement cage such that, for example, the netting comprises lengths of heating wire running perpendicular, horizontally and/or at an angle to the ground surface when the cage is inserted into the shaft. The longitudinal and horizontal lengths of heating wire can be spaced approximately evenly apart to enhance uniform heating. The netting can comprise at least one end of wire that extends to or above the ground surface and to be attachable to a power source. The netting can remain in the geopolymer pile after curing.

Figure 1D:
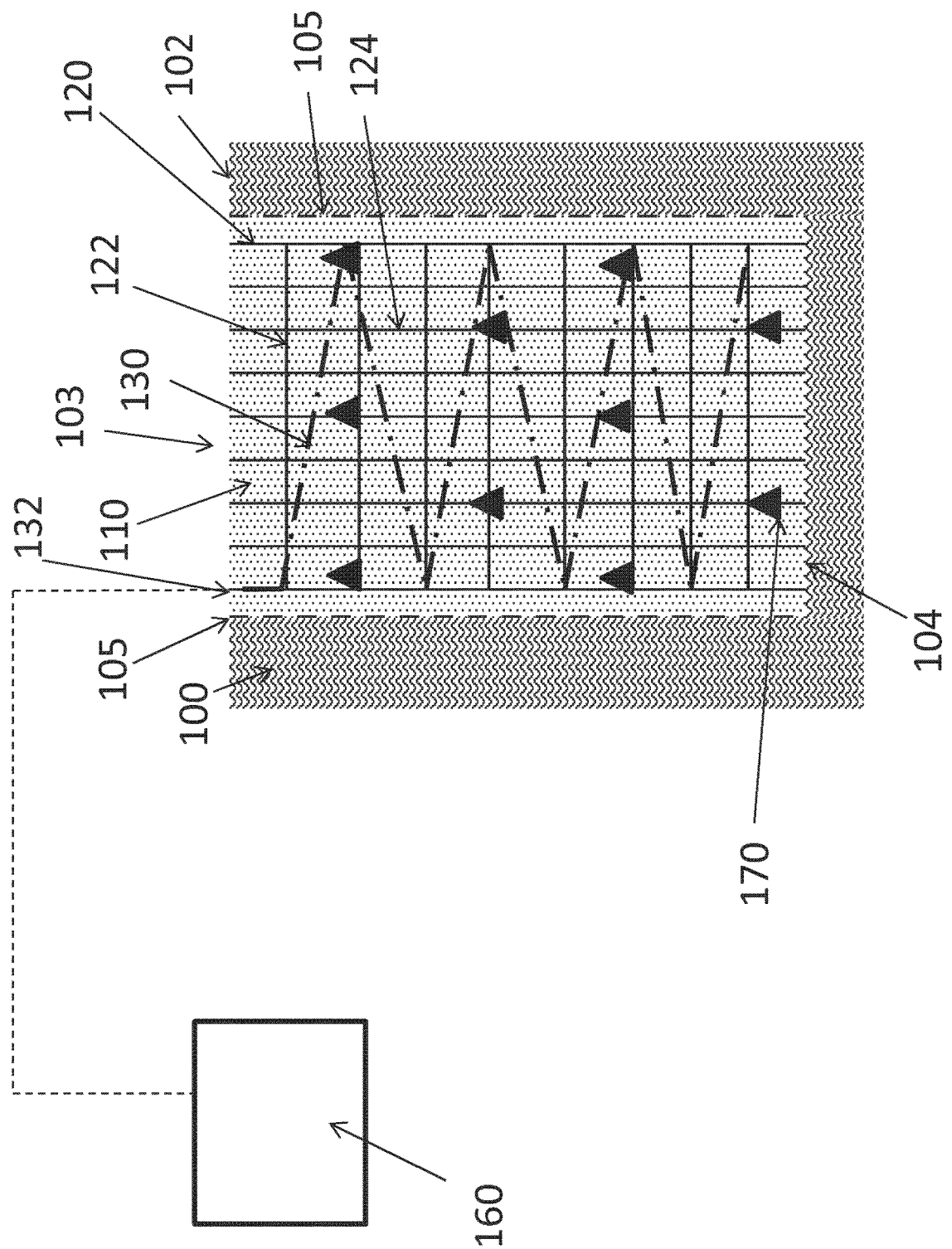
FIG. 1D is a schematic drawing of a side-view of a cylindrical cast-in-place pile described for FIGS. 1A-1C, further showing the optional inclusion of multiple temperature monitors.

In some embodiments, one or more temperature monitors or sensors can be used to monitor the temperature in the shaft during curing of the geopolymer composition. FIG. 1D shows the uncured cast-in-place pile of FIGS. 1A-1C also including a plurality of temperature monitors 170 positioned throughout uncured geopolymer composition 110. The temperature monitors or sensors can comprise, for example, thermocouple or thermistor devices. Any suitable temperature monitor or sensor can be used. Suitable temperature monitors include those temperature monitors and monitoring systems described for use in monitoring the temperature in concrete piles prepared from non-geopolymer concretes in U.S. Pat. Nos. 6,783,273; 8,382,369; and in U.S. Patent Application Publication No. 2015/0276702, the disclosures of which are incorporated herein in their entireties. The temperature monitor or monitors can be attached to the reinforcement cage, if desired, or be independent of any cage structure. The monitors can be uniformly distributed along the length of the shaft and/or across the diameter of a cross-section of the shaft or placed at any desired location or locations in the shaft. In some embodiments, a hollow PVC tube can be inserted into the pile shaft, parallel to the shaft axis, and a string of temperature sensors can be inserted into the tube to monitor the temperature at various depths below the surface while the geopolymer composition cures. The temperature can be monitored, for example, to determine when the uncured composition has reached a suitable temperature (e.g., between about 50° and about 80° C.) for curing and/or to determine if the amount of current being applied to the heating wire should be adjusted such that the wire supplies more or less heat. In some embodiments, the temperature monitors can send temperature data wirelessly to a computer or other receiver located above the ground surface.

In some embodiments, one or more rod-shaped heating units can be inserted into the shaft. The rod-shaped heating unit can comprise one or more lengths of heating wire (e.g., insulated heating wire), wherein one end of the heating wire is connectable to a power source. The rod-shaped heating unit is typically longer (e.g., several times longer) than it is wide. In some embodiments, the rod-shaped heating unit is configured to be removable.

In some embodiments, the rod-shaped heating unit can have a length that is approximately the same as the depth of the shaft. Alternatively, the rod can be shorter than the depth of the shaft, e.g., having a length that is about 60%, 70%, 75%, 80%, 85%, 90%, 95%, or more of the depth of the shaft. In some embodiments, the rod-shaped heating unit has a length of between about 10 cm and about 13 meters. In some embodiments, the rod-shaped heating unit has a length of between about 1 and about 3.5 meters. In some embodiments, the rod-shaped heating unit has a length of between about 30 cm and about 2 meters or between about 35 cm and about 1 meter.

In some embodiments, the rod-shaped heating unit is inserted into the shaft so that the long axis of the heating unit is approximately parallel to the axis of the shaft. In some embodiments, the rod-shaped heating unit can extend from the open end of the shaft to substantially the bottom end of the shaft (e.g., the rod-shaped heating unit can extend into the shaft approximately 75% of the depth of the shaft or more). In some embodiments, the rod-shaped shaft can extend into the shaft to within approximately 30 cm or less (e.g., about 30, 25, 20, 18, 16, 14, 12, 10, 9, 8, 7, 6, 5, 4, 3, 2, or 1 cm) from the bottom end of the shaft.

The rod-shaped heating unit can have a diameter that is similar to that described above for the heating wire or be larger. Thus, in some embodiments, the rod-shaped heating unit can have a diameter of about between about 0.1 mm and about 20 mm. In some embodiments, the heating unit has a diameter between about 0.5 mm and about 10 mm. In some embodiments, the rod-shaped heating unit can comprise a bundle or a coil of insulated heating wires covered in a metal, ceramic, or polymeric sheath or tubing, which can be rigid or flexible.

The rod-shaped heating unit typically has a cylinder shape, having a circular or oval-shaped cross section. However, the heating unit can have any suitable shape. In some embodiments, the rod-shaped heating unit can have a square or rectangular cross section. In some embodiments, the rod-shaped heating unit can further include one or more arms extending from the main axis of the heating unit, e.g., at a right or acute angle, such that the heating unit can comprise "arms" at one or more locations along the length of the unit that can extend into the uncured geopolymer composition, for example, like spokes of a wheel.

Figure 2B:
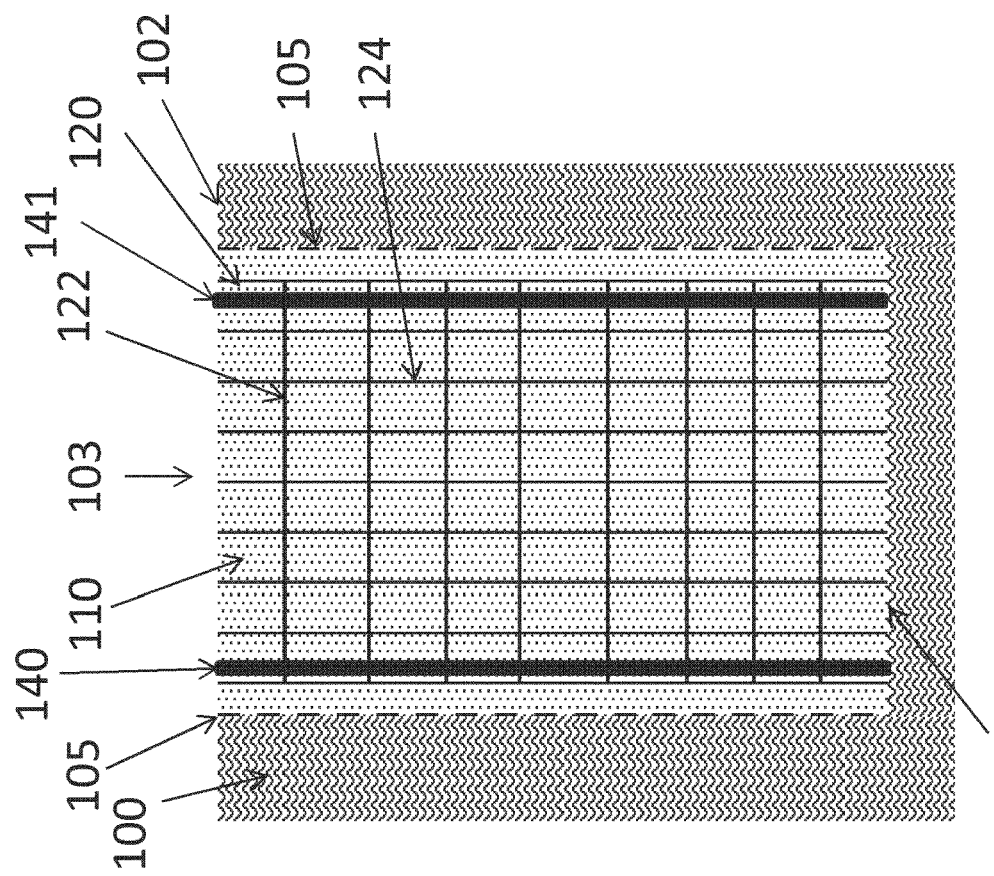
FIG. 2B is a schematic drawing of a side-view of the cylindrical pile of FIG. 2A.
Figure 2A:
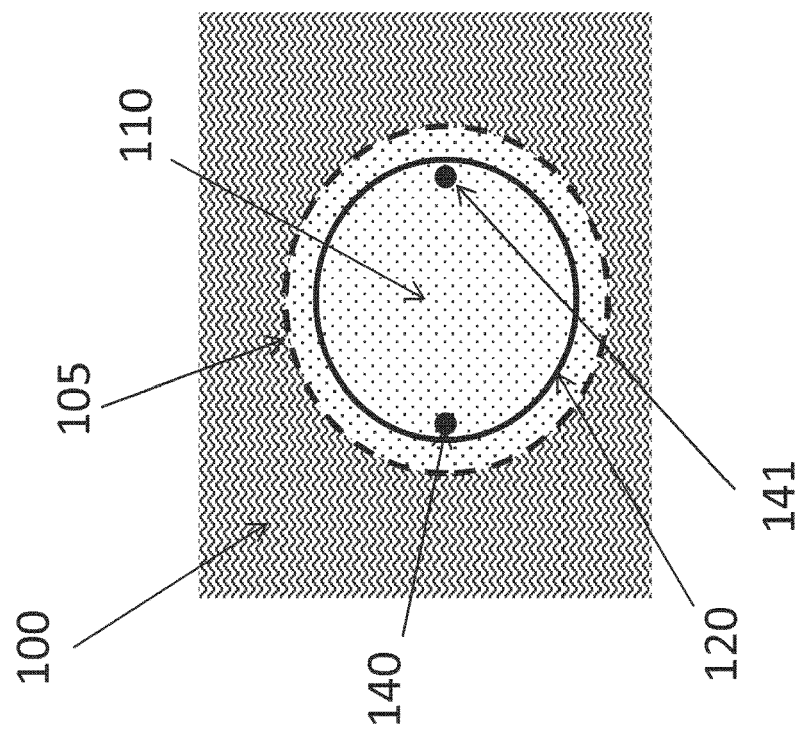
FIG. 2A is a schematic drawing of a cross-sectional view of an uncured, cylindrical cast-in-place geopolymer pile according to an alternative embodiment of the presently disclosed subject matter, wherein the pile is heated using two rod-shaped heating units located on opposite sides of the pile and near a reinforcement cage within the pile.

FIG. 2A shows a cross-sectional view of an uncured geopolymer pile of the presently disclosed subject matter wherein the heat to cure the geopolymer is supplied via rod-shaped heating units. FIG. 2A shows a shaft defined by shaft wall 105 surrounded by soil, rock, and/or sand 100 and filled with uncured geopolymer composition 110. Cylindrical reinforcement cage 120 is also inserted in the shaft. Two rod-shaped heating units, 140 and 141, are inserted in the shaft approximately parallel to shaft wall 105.

FIG. 2B shows a side view of the pile of FIG. 2A. Again, shaft wall 105 defines a shaft filled with uncured geopolymer composition 110 and surrounded by soil, rock and/or sand 100. Reinforcement cage 120, which includes horizontal rings 122 and longitudinal bars 124, is inserted in the shaft, traversing the shaft from open end 103 at ground level 102 to bottom end 104 of the shaft. Rod-shaped heating units 140 and 141 are inserted parallel to the shaft axis, near cage 120, traversing the length of the shaft.

In some embodiments, at least two rod-shaped heating units are inserted into the shaft proximal to a periphery of the shaft (i.e., near to or touching the shaft wall). In some embodiments, the at least two rod-shaped heating units are inserted into the shaft such that they are approximately evenly distributed within the shaft (e.g., so that the rods are inserted uniformly around the circumference of a concentric circular area located within the cross-section of the shaft). Uniform arrangement of the heating rods can help to provide uniform heating of the uncured geopolymer. In some embodiments, two rod-shaped heating units can be inserted into the shaft, located near to the shaft wall and/or a reinforcement cage inside the shaft at opposite sides of a diameter of the cross-section of the shaft, as shown in FIG. 2A.

In some embodiments, three rod-shaped heating units are inserted uniformly into the shaft. An example of a cast-in-place pile prepared using three rod-shaped units is shown in FIG. 2C. As in FIG. 2A, shaft wall 105 defines a cylindrical shaft surrounded by soil, rock and/or sand 100 and filled with uncured geopolymer composition 110. Reinforcement cage 120 and three rod-shaped heating units 140, 141, and 142 are inserted into the shaft. Rod-shaped heating units 140, 141, and 142 are placed uniformly to aid in uniform heating.

Figure 2D:
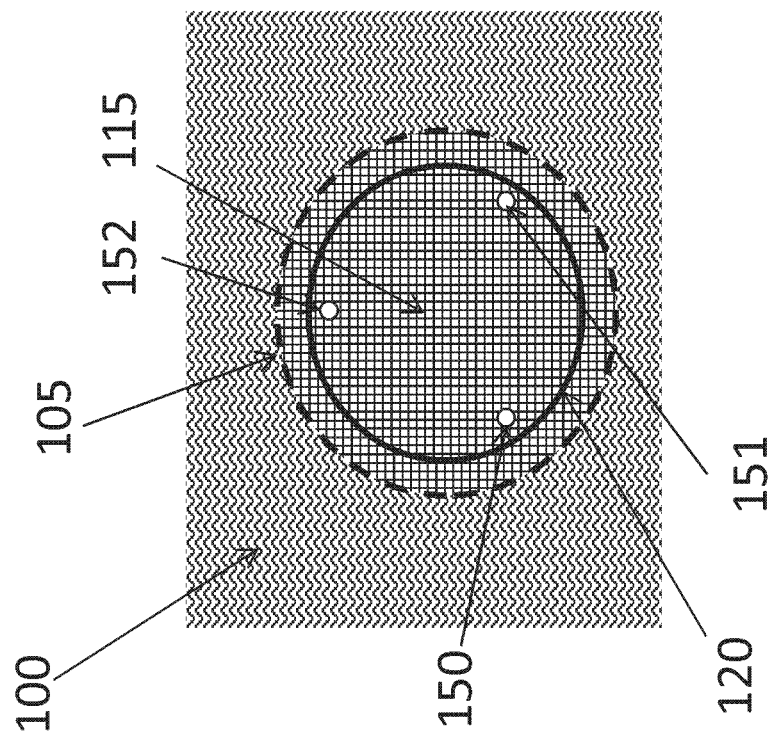
FIG. 2D is a schematic drawing of a cross-sectional view of the cured cast-in-place pile of FIG. 2C, showing the cured pile after removal of the rod-shaped heating units.
Figure 2C:
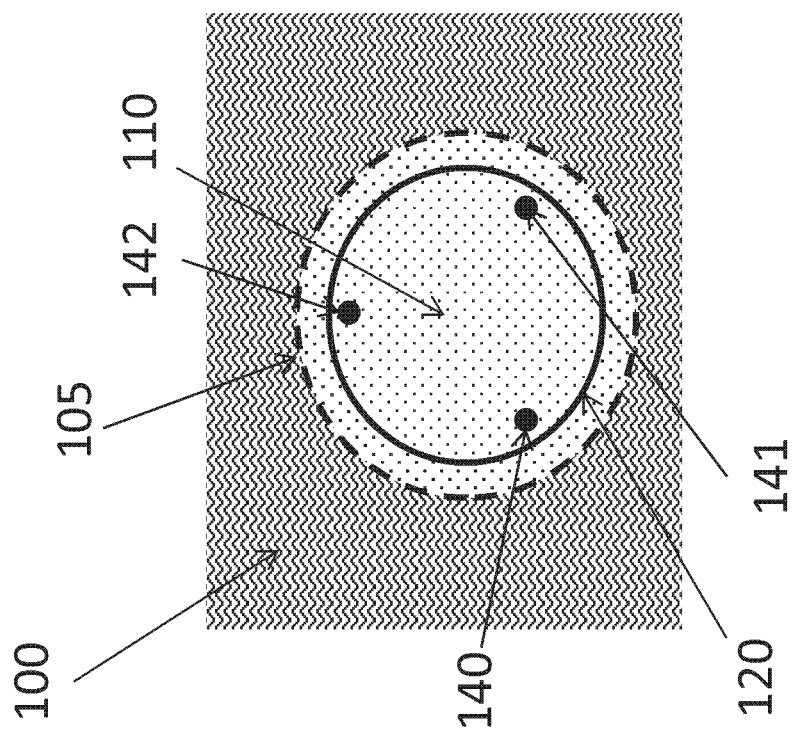
FIG. 2C is a schematic drawing of a cross-sectional view of a cylindrical cast-in-place pile similar to that of FIG. 2A, but including three rod-shaped heating units.

FIG. 2D shows the cast-in-place pile of FIG. 2C after curing and removal of the heating units. Reinforcement cage 120 remains in cured geopolymer 115. Removal of the heating units results in three unfilled holes, 150, 151, and 152. Typically, the total cross-sectional area of the holes is kept to about 10% of the total cross-sectional area of the pile or less (e.g., about 10%, 8%, 6%, 5%, 4%, 3%, 2%, or less) so that the holes do not significantly affect the overall strength of the pile.

The design of a removable rod-shaped heating unit of the presently disclosed subject matter can take different forms. In some embodiments, the removable rod-shaped heating unit can comprise a removable housing. For example, FIG. 3A shows rod-shaped heating unit 144 that comprises heating wire (e.g., insulated heating wire) 130 inserted inside housing 180. End 132 of wire 130 extends from an open end of housing 180 such that wire 130 can be connected to power supply 160, as shown in FIG. 3A. In some embodiments, each rod-shaped heating unit can be supplied with its own power supply. In some embodiments, more than one rod-shaped heating unit is connected to a single power supply.

Wire 130 can be a single heating wire or one or more bundles or braids of heating wire. Housing 180 can comprise a metal, metal alloy, ceramic, and/or a synthetic organic polymer, e.g., polyvinylchloride (PVC). In some embodiments, the housing can comprise a vinyl polymer (e.g., polyethylene, polypropylene, polybutadiene, polystyrene, PVC, polyvinyl acetate (PVAc), polyvinyl alcohol (PVA), or polyacrylonitrile). Thus, in some embodiments, commercially available tubing can be used to prepare a rod-shaped heating unit. The tubing can be cut to a suitable length at a building site and a wire inserted therein to prepare a rod-shaped heating unit on demand. Depending upon the rigidity and/or heat conductance properties of the housing material or materials, the housing can aid in placement of the heating wire, maintenance of the positioning of the heating wire, and/or to help conduct heat generated by the heating wire.

In some embodiments, the housing comprises a vinyl polymer and the geopolymer does not adhere to the vinyl polymer so that the rod-shaped heating unit, including both the housing and the heating wire, can be removed after the geopolymer is cured. In some embodiments, the heating wire can be removed from the heating rod after the geopolymer is cured, but the housing is left in place in the cured pile. Thus, the housing itself can be non-removable (or "sacrificial").

In some embodiments, the rod-shaped heating unit comprises a coated heating wire. FIG. 3B shows rod-shaped heating unit 146 that comprises heating wire (e.g., insulated heating wire) 130 that is coated with coating 185 to which geopolymer compositions do not adhere. For example, coating 185 can comprise a vinyl polymer. As with the rod-shaped heating unit shown in FIG. 3A, end 132 of heating wire 130 in heating unit 146 is connectable to power source 160.

As shown in FIGS. 2A-2D, rod-shaped heating units can be inserted close to or in contact with a reinforcement cage. However, rod-shaped heating units can be inserted independently of a reinforcement cage and/or used in the curing of piles where no reinforcement cage is used. For example, FIG. 4A shows a cross-sectional view of an uncured cylindrical pile. A shaft defined by shaft wall 105 is filled with uncured geopolymer composition 110 and is surrounded by soil, rock and/or sand 100. Three rod-shaped heating units 140, 141, and 142 are inserted into the shaft next to shaft wall 100, uniformly positioned around the shaft circumference. Thus, in some embodiments, the shaft wall can help to support and/or be used to guide the positioning of the heating units.

Figure 4B:
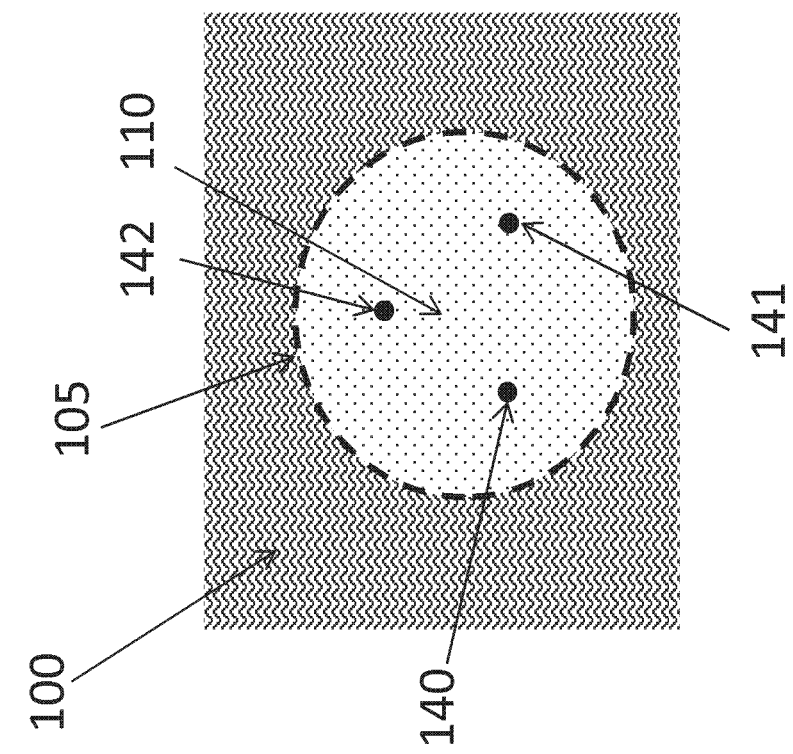
FIG. 4B shows a cross-sectional view of an uncured, cylindrical cast-in-place pile according to an alternative embodiment of the presently disclosed subject matter wherein the pile is prepared without the use of a reinforcement cage. Three rod shaped heating units are placed in the uncured geopolymer composition in a uniform arrangement.
Figure 4A:
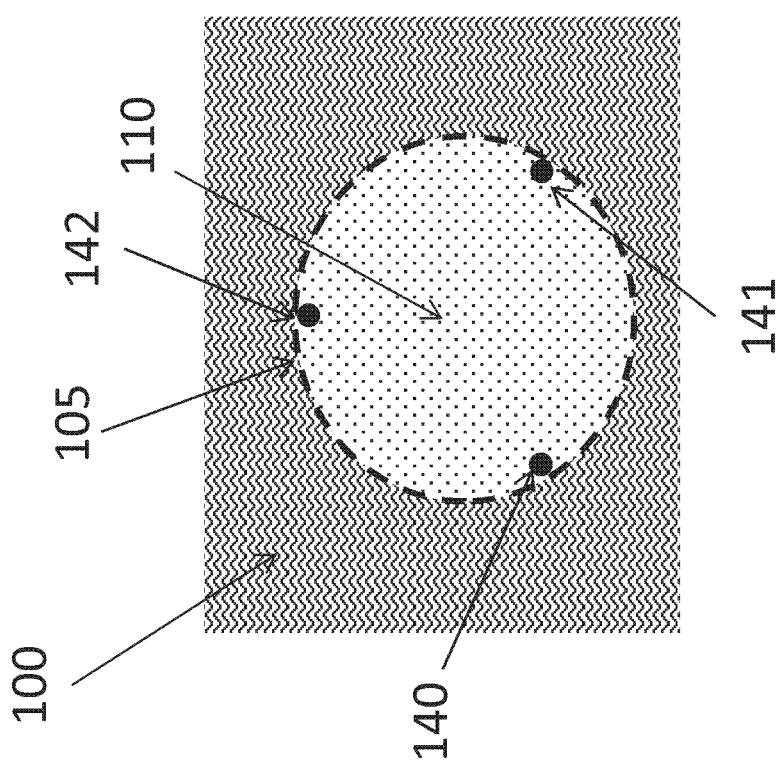
FIG. 4A shows a cross-sectional view of an uncured, cylindrical geopolymer cast-in-place pile according to an alternative embodiment of the presently disclosed subject matter wherein the pile is prepared without the use of a reinforcement cage. Three rod shaped heating units are placed approximately adjacent to the shaft wall at regular intervals.

However, in some embodiments, rod-shaped heating units can be inserted into an uncured pile closer to the center of the pile, as shown in FIG. 4B. FIG. 4B shows a shaft defined by shaft wall 105, filled with incured geopolymer composition 110, surrounded by soil, rock and/or sand 100, and including three rod-shaped heating units 140, 141, and 142. Each of rod-shaped heating units is inserted approximately half-way between the center of the shaft and shaft wall 105.

Accordingly, in some embodiments, one or more rod-shaped heating units can be inserted into the shaft at a location that is approximately $1/16^{th}$, $1/12$, $1/10^{th}$, $1/8^{th}$, $1/6^{th}$, $1/5^{th}$, $1/4^{th}$, $1/3^{rd}$, or $1/2$ of the distance from the shaft wall and the center of the shaft. In some embodiments, a heating unit can be inserted into the center of the shaft. In some embodiments, one or more heating units can be inserted closer to the center of the shaft than to the shaft wall. In some embodiments, the shaft is cylindrical and each of two or more rod-shaped heating units are inserted into the shaft at a position on a different radius formed between the center of the shaft and the outer edge of the shaft, but at the same distance from the shaft center, thereby forming points along the circumference of a circular area concentric to the circular area formed by the cross-section of the shaft.

Figure 4C:
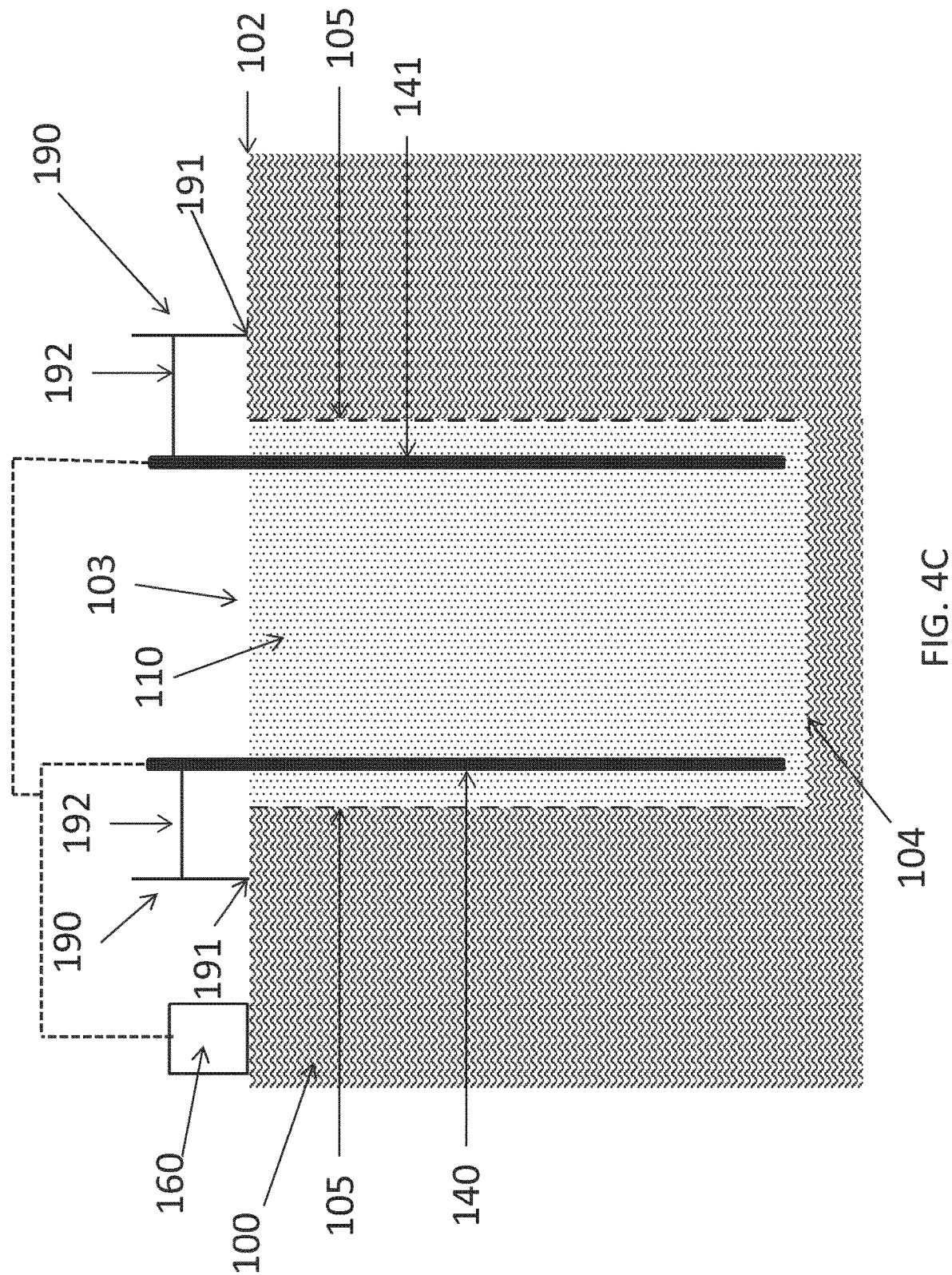
FIG. 4C is a side-view of an uncured, cylindrical geopolymer cast-in-place pile prepared without the use of a reinforcement cage. Two removable rod-shaped heating units which extend above the surface of the ground are held in place using clamps located on the ground surface.
Figure 4D:
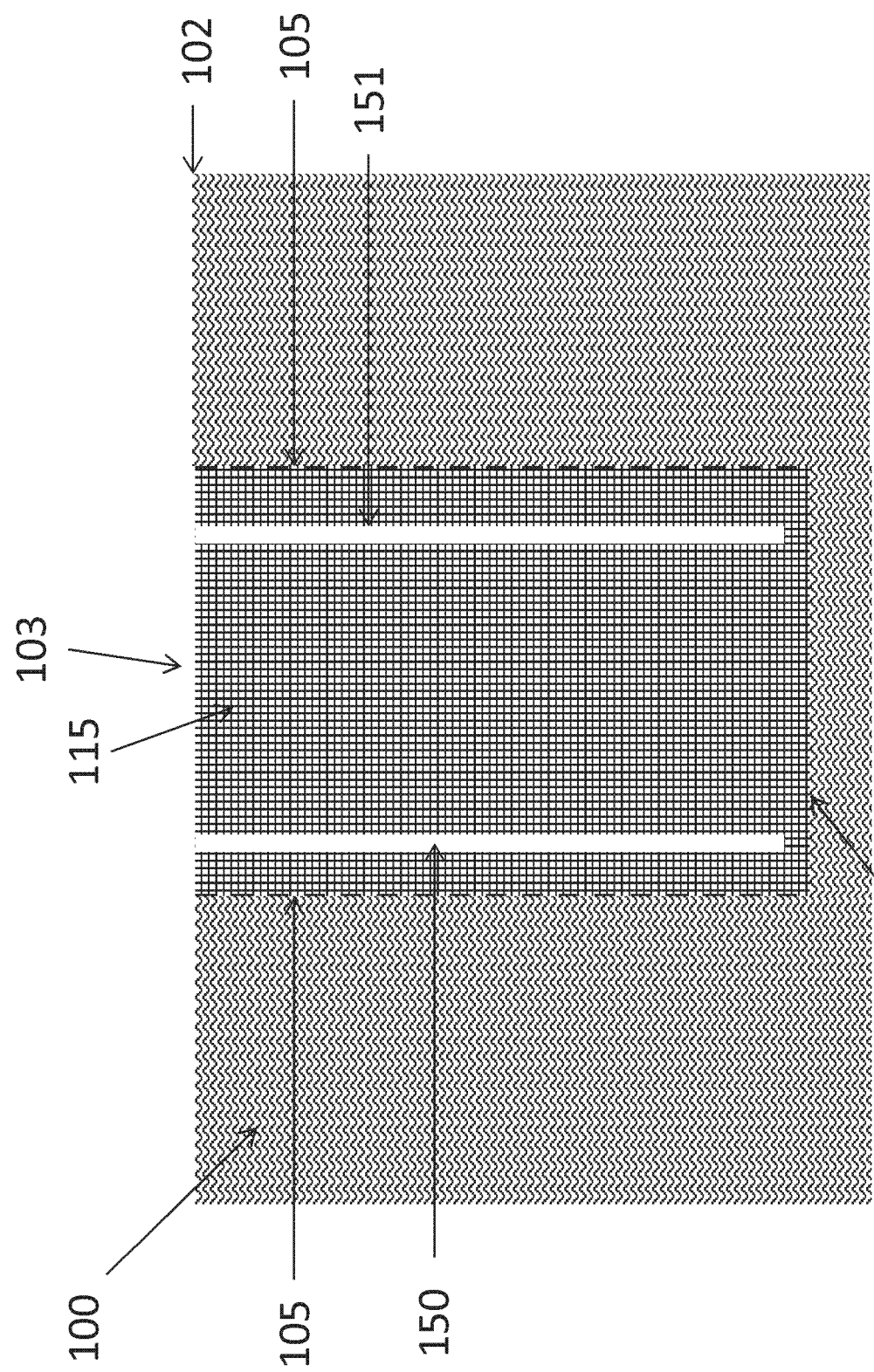
FIG. 4D is a side-view of the cast-in-place pile shown in FIG. 4C after curing and removal of the rod-shaped heating units and the clamps.

To keep rod-shaped heating units in place during the curing of the geopolymer pile, an above-ground holder or clamping device can be used, if desired. For example, FIG. 4C shows a side view of an uncured pile with two rod-shaped heating units 140 and 141 held in place using clamps 190. Each clamp 190 includes base 191 located on ground surface 102. Each clamp 190 also includes arm 192 that extends out over open end 103 of the shaft that is further defined by shaft wall 105 and bottom end 104. Each arm 192 attaches to one of rod-shaped heating units 140 and 140, which extends into the shaft though open end 103 parallel to shaft wall 105. The shaft is also filled with uncured geopolymer composition 110 and is surrounded by soil, rock and/or sand 100. Rod-shaped heating units 140 and 141 are both connected to power source 160. FIG. 4D shows the pile of FIG. 4C after curing is complete and the heating units, clamps, and power source are removed. Open, unfilled holes 150 and 151 remain in cured geopolymer 115.

The uncured geopolymer compositions of the presently disclosed subject matter can comprise solids including one or more pozzolanic materials selected from, but not limited to, class F fly ash, class C fly ash, slag (e.g., ground granulated blast furnace slag), metakoalin (e.g., calcined metakolin) and red mud. In some embodiments, the red mud can be red mud treated to a flue gas desulfurization process. In some embodiments, additional calcium-containing material can be added. The uncured compositions also include an alkaline agent, such as an alkali metal hydroxide, such as sodium hydroxide or potassium hydroxide, or water glass. In some embodiments, the alkaline agent is provided in the form of an alkaline solution. In some embodiments, the alkaline solution comprises about 10 moles per liter (10 M) of an alkali metal hydroxide. In some embodiments, the alkali metal hydroxide is sodium hydroxide. In some embodiments, the uncured composition further comprises aggregate.

The uncured geopolymer composition includes a mixture of a solution and a solid. In some embodiments, the uncured geopolymer composition comprises class F fly ash as the solid and a 10 M aqueous solution of sodium hydroxide. In general, lower solution to solid ratios can result in higher strength piles and less volume change during curing. However, lower solution to solid ratios can result in non-uniformly mixed uncured compositions and poor workability. On the other hand, since the alkaline agent tends to be the more expensive starting material for the geopolymer, high solution to solid ratios can be more expensive. In some embodiments, the weight ratio of aqueous solution to solid in the uncured composition is between about 0.3 and about 0.6 or between about 0.3 and about 0.5 (e.g., about 0.30, 0.35, 0.40, 0.45, or about 0.50). In some embodiments, the ratio of aqueous solution to solid is about 0.3.

Once the shaft is filled with the uncured composition, electric current (e.g., a constant electric current) is applied to the one or more heating wires of the one or more heating units sufficient to heat the uncured composition to a stable curing temperature of between about 50° C. and about 80° C. In some embodiments, the temperature at one or more locations in the uncured pile is monitored with a temperature monitor or monitors, e.g., to determine when the stable curing temperature is reached, and/or to determine if the electric current should be adjusted so that more or less heat is generated by the wire(s). Once a stable temperature is reached, the piles are kept curing at the stable temperature for several hours. Thus, in some embodiments, the current is continually applied for at least 12 hours after the stable curing temperature is reached, to keep the temperature at the stable curing temperature. In some embodiments, the current is applied for at least 12, 16, 20, 24, 28, 32, 36, 40, 44, 48, or more hours after the stable curing temperature is reached. In some embodiments, the piles continue to cure for up to about one week or more.

In some embodiments, the current is applied for at least 24 hours after the stable curing temperature is reached. In some embodiments, applying the current comprises supplying a voltage of 30 volts or less (e.g., about 30, 25, 20, 16, 12 or less volts) at a current of between 0 to about 10 ampere (e.g., about 1, 2, 3, 4, 5, 6, 7, 8, 9, or 10 ampere).

Accordingly, the cast-in-place geopolymer piles of the presently disclosed subject matter can be cured within time periods that are suitable for geotechnical applications and can provide geopolymer piles having good strength. In some embodiments, the cured cast-in-place geopolymer concrete piles prepared by the presently disclosed methods have a mean compressive strength of at least about 20 megapascal (MPa). In some embodiments, the piles have a mean compressive strength of about 40 MPa or more. In some embodiments, the piles have a mean compressive strength of about 50 MPa or more (e.g., of about 50, 51, 52, 53, 54 or about 55 MPa or more).

In some embodiments, the presently disclosed subject matter provides a geopolymer concrete pile prepared according to a method disclosed herein. In some embodiments, the presently disclosed subject matter provides a cast-in-place geopolymer concrete pile prepared by curing an uncured geopolymer concrete or uncured geopolymer cement using heat produced by a heating wire. In some embodiments, the heating wire is an insulated heating wire.

In some embodiments, the presently disclosed subject matter provides a method of producing a building or construction comprising the use of a cast-in-place geopolymer concrete pile prepared using heat produced by a heating wire (e.g., an insulated heating wire) and/or according to a method described herein. The building or construction can be any building or construction having below-ground foundations (e.g., footings or piles). The building can be a residential or commercial building. In some embodiments, the construction can be selected from the group including, but not limited to, a bridge, a viaduct, a pier, a wharf, a jetty, a levee, an embankment, a tunnel, a dike, a channel, a reservoir, a dam, a landfill, or an off-shore platform (e.g., a platform for an off-shore oil rig).

In some embodiments, the presently disclosed subject matter provides a system or kit for preparing a cast-in-place geopolymer concrete pile. For example in some embodiments, the system or kit can comprises at least one of (a) a heating unit comprising one or more lengths of heating wire attached to a reinforcement cage or (b) one or more rod-shaped heating units comprising a heating wire. In some embodiments, the kit comprises a mixture of (a) and (b)-type heating units. In some embodiments, system or kit comprises a heating unit comprising one or more lengths of heating wire attached to a reinforcement cage. In some embodiments, the heating wire is an insulated heating wire. In some embodiments, the reinforcement cage is a steel reinforcement cage, e.g., comprising one or more steel rods, pipes, rings or coils. In some embodiments, the heating wire is wound around the reinforcement cage one or more times circularly and/or uniformly. In some embodiments, the heating wire traverses at least about 75% or more of the length of the cage. One end of the heating wire is connectable to an electrical power source.

In some embodiments, the system or kit includes one or more rod-shaped heating units. The rod-shaped heating unit can include one or more lengths of an insulated heating wire enclosed in a detachable or non-detachable housing, e.g., comprising a metal, ceramic, or polymeric pipe. In some embodiments, the rod-shaped heating unit comprises one or more lengths of heating wire coated with a coating that does not adhere to geopolymer compositions. In some embodiments, the coating is a vinyl coating. One end of each rod-shaped heating unit includes an opening (e.g., for one end of each heating wire) so that the heating wire or wires can be connected to a power source.

In some embodiments, the system or kit further includes an uncured geopolymer composition or materials that can be mixed together to form an uncured geopolymer composition. The composition or the system or kit can include at least one pozzolanic material selected from class F fly ash, class C fly ash, slag (e.g., ground granulate blast furnace slag), metakaolin (e.g., calcined metakaolin), and red mud. The composition or the system or kit can further include at least one alkaline agent or alkaline solution, such as an alkali metal hydroxide (e.g., sodium hydroxide or potassium hydroxide) or water glass. In some embodiments, the system or kit further includes aggregate for the geopolymer composition. In some embodiments, the uncured geopolymer composition comprises class F fly ash and sodium hydroxide or a aqueous sodium hydroxide solution (e.g., a 10 M sodium hydroxide solution). In some embodiments, the weight ratio of aqueous solution to solid in the uncured composition can be between about 0.3 and about 0.6 or between about 0.3 and about 0.5. In some embodiments, the ratio is about 0.3.

In some embodiments, the system or kit further includes one or more temperature monitors, a power source, clamping devices for rod-shaped heating units, and/or instructions for preparing the cast-in-place geopolymer pile. In some embodiments, the power source is configured to supply 30 volts or less at a current of between about 0 and about 10 ampere. In some embodiments, the power source includes a transformer and a mains power source.

III. EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1

Materials and Methods

Cast-in-situ geopolymer piles with a height of 40 cm and a diameter of 30 cm were prepared. When used, a reinforcement cage made from 19-gauge steel with a diameter of 22 cm was installed into the core position of piles. FIGS. 1A and 1B show an exemplary pattern for a reinforcement-cage associated heating wire, wherein an insulated steel wire with a diameter of 0.64 mm is uniformly circled around the cage. The same type of insulated steel wire was used to make two rod-like heating units, which were fixed to a similar reinforcement cage. The two ends of the wire were connected to the secondary terminals of a transformer, which can convert a supply voltage of the order of standard mains voltage volts to less than 30 volts at 0 to 10 A current throughput depending on the wire size. The insulated steel wire had temperature rating up to 180° C. Ten digital thermometers with a temperature range between −50° C. and 110° C. were placed in the pile to monitor the change of temperature during the curing. Four of them were equally spaced at the core of the pile along the vertical direction, and the other six thermometers were spaced equally in the cage along the horizontal direction about 10 cm below the surface. Another contrast pile with the same dimensions, but without a heating unit was also prepared for comparison. All the piles were cast at the same location with the same clay soil.

A class F fly ash activated by sodium hydroxide solution was used for the cast-in-situ geopolymer pile. The chemical composition of the fly ash used is listed in Table 1, below. The preparation of geopolymer cement began with adding a 10 M sodium hydroxide solution to the fly ash powder. This mixture was stirred for 10 minutes. In general, a lower solution/solid ratio results in a higher strength geopolymer pile and in less volume change. A lower solution/solid ration is also beneficial economically, because the alkaline solution is the more expensive starting material. However, a very low solution/solid ratio can cause issues in mixing uniformity and workability. A fixed solution/solid ratio of 0.3 was selected for the geopolymer piles of the present examples.

The geopolymer cement was then poured into the pile pit (i.e., the pile shaft). After that, a constant electrical current was driven to the wire to heat the pile. When the temperature of pile reached a predetermined designated curing temperature, the piles were kept curing at high temperature for 24 hours. The piles were taken out of the pile pit seven days after casting, and 12 cores with a diameter of 2.5 cm and a height of 5 cm were drilled randomly from the piles. The unconfined compressive strengths of the core samples were tested at a constant loading rate of 0.5%/min using a Material Testing System (MTS). The strength of the contrast pile (i.e., the pile without the heating unit) was not strong enough to drill cores after seven days. Therefore, no compressive strength results could be obtained for the contrast pile.

TABLE 1

Fly ash composition.
Chemical constituents of fly ash, wt %

| $SiO_2$ | $Al_2O_3$ | $Fe_2O_3$ | CaO | $Na_2O$ | MgO | $K_2O$ | $SO_3$ |
|---|---|---|---|---|---|---|---|
| 43.1 | 22.8 | 23.6 | 3.3 | 0.8 | 0.7 | 1.6 | 1.2 |

Example 2

Cast-in-Place Pile with Uniformly Wound Heating Unit

The pattern of heating unit for the present example is as shown in FIGS. 1A and 1B. A total of 170 watts of power with a voltage at 30 volts was input into the wire to generate the heat, and the change of temperature of the pile was recorded as shown in Table 2. As shown in Table 2, it took approximately 15 hours before the temperature of the pile reached a stable value. The pile was cured at this temperature for additional 24 hours. A consistent distribution of temperature can be observed in the cross-section of the pile, with a relatively higher temperature appearing in the middle of the pile along the vertical direction. It should be noted here that the input power was slightly decreased following the increasing of the temperature due to the changes in wire resistance.

TABLE 2

Curing Temperature in Pile with Uniformly Wound Heating Unit.
Change of temperature of the pile after heating, °C.

| Interval | Thermometers along the horizontal direction | | | | | | Thermometers along the vertical direction | | | |
|---|---|---|---|---|---|---|---|---|---|---|
| (Hr) | 1 | 2 | 3 | 4 | 5 | 6 | 7 | 8 | 9 | 10 |
| 0 | 15.3 | 15.2 | 14.8 | 15.3 | 15.1 | 15.3 | 15.4 | 15.5 | 15.7 | 15.7 |
| 2.5 | 31.2 | 25.9 | 21.7 | 22.9 | 26.7 | 28.4 | 25.3 | 28.7 | 27.6 | 26.2 |
| 6.5 | 48.6 | 45 | 39.3 | 42.3 | 45.7 | 45.6 | 49.6 | 58.6 | 53.6 | 48.6 |
| 9 | 57.1 | 54.1 | 47.8 | 51.6 | 54.5 | 53.9 | 60.6 | 70.4 | 64.0 | 57.9 |
| 15 | 69.3 | 67.9 | 61.1 | 66.2 | 68.5 | 66.2 | 77.4 | 84.2 | 72.4 | 65.6 |
| 21 | 69.3 | 67.9 | 61.1 | 66.4 | 68.9 | 66.4 | 77.8 | 84.9 | 73.2 | 66.5 |

12 cores were drilled randomly from the pile seven days after casting, and the test results of unconfined compressive strength are summarized in Table 3. It may be noted that the compressive strength of a cement or concrete able for being used in the cast-in-place pile is at least 20 MPa.

TABLE 3

Compressive Strength of Pile Prepared with Uniformly Wound Heating Unit.
Unconfined compressive strength, MPa

| Sample number | Maximum | Minimum | Mean | Std Dev |
|---|---|---|---|---|
| 12 | 55.9 | 42.1 | 47.2 | 3.64 |

Example 3

Cast-in-Place Pile with Rod-Like Heating Units

The pattern of rod-shaped heating units for the present example is shown in FIGS. 2A and 2B. A total of 170 watts of power with a voltage at 30 volts was input into the two separate rod-like heating units to generate the heat, and the change of temperature of the pile was recorded as shown in Table 4, below. It took approximately 15 hours before the temperature of pile reached a stable value. Then the pile was cured at this temperature for an additional 24 hours. A less consistent distribution of temperature in the pile was observed in comparison to the pile prepared in Example 2. However, with a reasonable design, the rod-shaped heating units can be retracted from the pile after the curing and be reused for a similar geopolymer pile.

TABLE 4

Curing Temperature in Pile with Rod-Like Heating Units.
Change of temperature of the pile after heating, °C.

| Interval | Thermometers along the horizontal direction | | | | | | Thermometers along the vertical direction | | | |
|---|---|---|---|---|---|---|---|---|---|---|
| (Hr) | 1 | 2 | 3 | 4 | 5 | 6 | 7 | 8 | 9 | 10 |
| 0 | 15.5 | 15.2 | 15.2 | 15.3 | 15.1 | 14.9 | 15.1 | 15.3 | 15.8 | 15.7 |
| 3 | 59.3 | 56.0 | 32.6 | 31.4 | 57.2 | 58.3 | 30.1 | 33.6 | 30.7 | 25.6 |
| 6 | 66.1 | 58.5 | 44.7 | 40.3 | 59.9 | 62.3 | 47.3 | 52.6 | 47.2 | 40.8 |
| 9 | 69.1 | 61.8 | 50.2 | 48.6 | 62.6 | 64.3 | 58.2 | 66.5 | 61 | 55.2 |
| 15 | 73.1 | 67.7 | 57.6 | 55.5 | 66.0 | 70.1 | 66.2 | 75.4 | 68.8 | 61.6 |
| 21 | 73.2 | 67.7 | 57.8 | 55.6 | 66.0 | 70.0 | 66.5 | 75.6 | 69.0 | 61.5 |

Twelve cores were drilled randomly from the pile seven days after casting, and the test results of unconfined compressive strength are summarized in Table 5, below. The statistical results reveal that the compressive strength of the present pile can also satisfy the usual strength requirement, albeit with a relatively higher standard deviation compared to the pile of Example 2.

TABLE 5

Compressive Strength of Pile Prepared with Rod-Like Heating Units.
Unconfined compressive strength, MPa

| Sample number | Maximum | Minimum | Mean | Std Dev |
|---|---|---|---|---|
| 12 | 54.6 | 34.2 | 44.0 | 5.54 |

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method of preparing a cast-in-place geopolymer concrete pile, the method comprising:
   (a) providing a subterranean shaft, wherein the shaft extends below ground surface and comprises an open end at ground surface and a bottom end at a predetermined depth below ground surface;
   (b) inserting one or more rod-shaped heating units into the shaft, wherein each rod-shaped heating unit has a length and a width where said length is greater than said width, wherein each rod-shaped heating unit comprises one or more lengths of insulated heating wire, wherein the insulated heating wire comprises an electrically conductive core surrounded by a layer of an electrically insulating material, and wherein each rod-shaped heating unit is connectable to a power source;

(c) filling the shaft with an uncured concrete composition comprising an uncured geopolymer concrete or an uncured geopolymer cement; and (d) providing an electric current to the one or more rod-shaped heating units, thereby providing heat sufficient to cure the uncured concrete composition and prepare a cast-in-place geopolymer concrete pile, wherein one or more of the one or more rod-shaped heating units are configured to be removed from the shaft after the uncured concrete composition is cured.

2. The method of claim 1, wherein each rod-shaped heating unit extends from the open end of the shaft to substantially the bottom end of the shaft when inserted in the shaft.

3. The method of claim 2, wherein each rod-shaped heating unit is inserted into the shaft proximal to a periphery of the shaft.

4. The method of claim 3, wherein at least two of the one or more rod-shaped heating units are inserted into the shaft such that they are approximately evenly distributed around the periphery of the shaft.

5. The method of claim 4, wherein the one or more rod-shaped heating units comprise two or three rod-shaped heating units.

6. The method of claim 1, wherein the insulated heating wire has a diameter of between about 0.40 millimeters and about 7.35 millimeters.

7. The method of claim 1, wherein the uncured concrete composition comprises an uncured geopolymer cement comprising one or more pozzolanic materials selected from the group consisting of class F fly ash, class C fly ash, ground granulated blast furnace slag, calcined metakaolin, and red mud; and one or more alkaline agent selected from the group consisting of sodium hydroxide, potassium hydroxide, and water glass.

8. The method of claim 7, wherein the uncured geopolymer cement comprises class F fly ash and a 10 Molar (M) aqueous solution of sodium hydroxide.

9. The method of claim 8, wherein the weight ratio of aqueous solution to solid in the uncured cement is between about 0.3 and about 0.5.

10. The method of claim 8, wherein the weight ratio of aqueous solution to solid in the uncured cement is about 0.3.

11. The method of claim 1, wherein providing the electric current comprises applying sufficient electric current to the one or more rod-shaped heating units to heat the uncured concrete composition to a stable temperature of between about 50° C. and about 80° C.

12. The method of claim 11, wherein providing the electric current further comprises applying sufficient electrical current to keep the temperature of the uncured concrete composition at the stable temperature for at least 24 hours.

13. The method of claim 1, further comprising inserting one or more temperature monitors into the shaft to monitor temperature during step (d).

14. The method of claim 1, wherein each of the one or more rod-shaped heating units is adapted for connection to the same power source.

15. The method of claim 1, wherein the power source comprises a transformer and a main power source.

16. The method of claim 15, wherein the transformer is capable of supplying a voltage of 30 Volts or less at a current of 0 to 10 ampere to the one or more lengths of heating wire of a heating unit.

17. The method of claim 1, wherein the cast-in-place geopolymer concrete pile has a mean compressive strength of at least 20 megapascal (MPa).

18. The method of claim 17, wherein the cast-in-place geopolymer pile has a mean compressive strength of at least about 40 MPa or at least about 50 MPa.

19. The method of claim 1, further comprising inserting a reinforcement cage into the shaft, wherein the reinforcement cage is configured to fit within the shaft.

20. A cast-in-place geopolymer concrete pile prepared by a method comprising:

(a) providing a subterranean shaft, wherein the shaft extends below ground surface and comprises an open end at ground surface and a bottom end at a predetermined depth below ground surface;

(b) inserting one or more heating units into the shaft, wherein each heating unit comprises one or more lengths of a heating wire, said heating wire comprising an electrically conductive wire, and wherein each heating unit is connectable to a power source;

(c) filling the shaft with an uncured concrete composition comprising an uncured geopolymer concrete or an uncured geopolymer cement; and (d) providing an electric current to the one or more heating units, thereby providing heat sufficient to cure the uncured concrete composition and prepare a cast-in-place geopolymer concrete pile; wherein the one or more heating units comprise one or more rod-shaped heating units, wherein each of the one or more rod-shaped heating units has a length and a width where said length is greater than said width, and wherein one or more of the one or more rod-shaped heating units is configured to be removed from the shaft after the uncured concrete composition is cured.

21. A method of producing a building or construction, the method comprising: installing at least one cast-in-place geopolymer concrete pile; and supporting a building or construction with the at least one cast-in-place geopolymer concrete pile, wherein installing the at least one cast-in-place geopolymer concrete pile comprises:

(a) providing a subterranean shaft, wherein the shaft extends below ground surface and comprises an open end at ground surface and a bottom end at a predetermined depth below ground surface;

(b) inserting one or more heating units into the shaft, wherein each heating unit comprises one or more lengths of a heating wire, said heating wire comprising an electrically conductive wire, and wherein each heating unit is connectable to a power source;

(c) filling the shaft with an uncured concrete composition comprising an uncured geopolymer concrete or an uncured geopolymer cement; and (d) providing an electric current to the one or more heating units, thereby providing heat sufficient to cure the uncured concrete composition and prepare the cast-in-place geopolymer concrete pile;

wherein the one or more heating units comprise one or more rod-shaped heating units, wherein each of the one or more rod-shaped heating units has a length and a width where said length is greater than said width, and wherein one or more of the one or more rod-shaped heating units is configured to be removed from the shaft after the uncured concrete composition is cured.

* * * * *